US012800696B2

(12) United States Patent
Wahl et al.

(10) Patent No.: US 12,800,696 B2
(45) Date of Patent: Nov. 17, 2026

(54) UWB ANCHOR WITH DOUBLE ANTENNA

(71) Applicants: TRUMPF Tracking Technologies GmbH, Ditzingen (DE); Zigpos GmbH, Dresden (DE)

(72) Inventors: Eberhard Wahl, Weilheim an der Teck (DE); Andreas Schumacher, Stuttgart (DE); Erik Mademann, Dresden (DE); Christoph Goetze, Dresden (DE); Markus Scholz, Karlsruhe (DE)

(73) Assignees: TRUMPF TRACKING TECHNOLOGIES GMBH, Ditzingen (DE); ZIGPOS GMBH, Dresden (DE)

( * ) Notice: Subject to any disclaimer, the term of this patent is extended or adjusted under 35 U.S.C. 154(b) by 558 days.

(21) Appl. No.: 18/462,448

(22) Filed: Sep. 7, 2023

(65) Prior Publication Data

US 2023/0417860 A1 Dec. 28, 2023

Related U.S. Application Data

(63) Continuation of application No. PCT/EP2022/055836, filed on Mar. 8, 2022.

(30) Foreign Application Priority Data

Mar. 11, 2021 (DE) ..................... 10 2021 202 365.7

(51) Int. Cl.

*G01S 5/02* (2010.01)
*H01Q 5/25* (2015.01)
*G01S 3/18* (2006.01)

(52) U.S. Cl.

CPC ........... *G01S 5/02213* (2020.05); *H01Q 5/25* (2015.01); *G01S 3/18* (2013.01)

(58) Field of Classification Search

CPC .......... G01S 5/02213; G01S 3/18; H01Q 5/25
USPC ................................ 342/465, 463, 451, 450
See application file for complete search history.

(56) References Cited

U.S. PATENT DOCUMENTS

| | | | | |
|---|---|---|---|---|
| 8,183,957 B2 * | 5/2012 | Sasaki | H04W 52/42 333/132 |
| 11,327,151 B2 * | 5/2022 | Lentsch | H04B 1/7163 |
| 11,663,864 B2 * | 5/2023 | Kincaid | G01S 5/0289 340/5.31 |
| 2011/0133988 A1 | 6/2011 | Fukagawa et al. | |

(Continued)

FOREIGN PATENT DOCUMENTS

| | | | |
|---|---|---|---|
| CN | 111865354 A * | 10/2020 | H04W 64/00 |
| CN | 112260717 A * | 1/2021 | H04B 1/401 |

(Continued)

OTHER PUBLICATIONS

Schroeer Guido, "A Real-Time UWB Multi-Channel Indoor Positioning System for Industrial Scenarios", 2018 International Conference On Indoor Positioning and Indoor Navigation (IPIN), IEEE, Sep. 24, 2018 (Sep. 24, 2018), XP033447072, DOI: 10.1109/IPIN.2018.8533792.

*Primary Examiner* — Chuong P Nguyen
(74) *Attorney, Agent, or Firm* — LEYDIG, VOIT & MAYER, LTD.

(57) ABSTRACT

An ultra-wideband (UWB) anchor for localizing a first UWB mobile unit and a second UWB mobile unit in an interior space includes a first UWB antenna for communication with the first UWB mobile unit, and a second UWB antenna for communication with the second UWB mobile unit.

16 Claims, 3 Drawing Sheets

(56) References Cited

U.S. PATENT DOCUMENTS

| | | | | |
|---|---|---|---|---|
| 2019/0097317 | A1 | 3/2019 | Di Nallo et al. | |
| 2019/0387374 | A1 | 12/2019 | Gherardi et al. | |
| 2022/0052452 | A1* | 2/2022 | Baek | H01Q 1/38 |
| 2024/0053428 | A1* | 2/2024 | Wahl | G01S 5/02213 |

FOREIGN PATENT DOCUMENTS

| | | | | | |
|---|---|---|---|---|---|
| EP | 4386446 | A1 * | 6/2024 | | G01S 13/66 |
| WO | WO 2020212599 | A1 | 10/2020 | | |
| WO | WO 2020212722 | A1 | 10/2020 | | |
| WO | WO-2020218912 | A1 * | 10/2020 | | H01Q 1/38 |
| WO | WO-2022229239 | A1 * | 11/2022 | | G01S 5/0268 |

* cited by examiner

UWB ANCHOR WITH DOUBLE ANTENNA

CROSS-REFERENCE TO PRIOR APPLICATION

This application is a continuation of International Application No. PCT/EP2022/055836 (WO 2022/189404 A1), filed on Mar. 8, 2022, and claims benefit to German Patent Application No. DE 10 2021 202 365.7, filed on Mar. 11, 2021. The aforementioned applications are hereby incorporated by reference herein.

FIELD

Embodiments of the present invention relate to an ultra-wideband (UWB) anchor for localizing mobile units, in an indoor space, such as an industrial manufacturing facility. Embodiments of the present invention further relate to a localization system comprising a plurality of such UWB anchors. In addition, embodiments of the present invention relate to a method for localizing mobile units, in an indoor space, in particular in an industrial manufacturing facility.

BACKGROUND

An indoor space can be, for example, a sales space (retail) or room of a health care facility, or a space in an industrial manufacturing facility. In industrial manufacturing, for example in the form of metal processing, preferably in the form of sheet metal processing, it is known to localize mobile units. In industrial manufacturing, workers typically also move around with mobile terminals that cannot be precisely localized in a simple way. However, determining the location of these mobile terminals would significantly increase safety in industrial manufacturing facilities. Furthermore, manufacturing would be easier to plan.

SUMMARY

Embodiments of the present invention provide an ultra-wideband (UWB) anchor for localizing a first UWB mobile unit and a second UWB mobile unit in an interior space. The UWB anchor includes a first UWB antenna for communication with the first UWB mobile unit, and a second UWB antenna for communication with the second UWB mobile unit.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
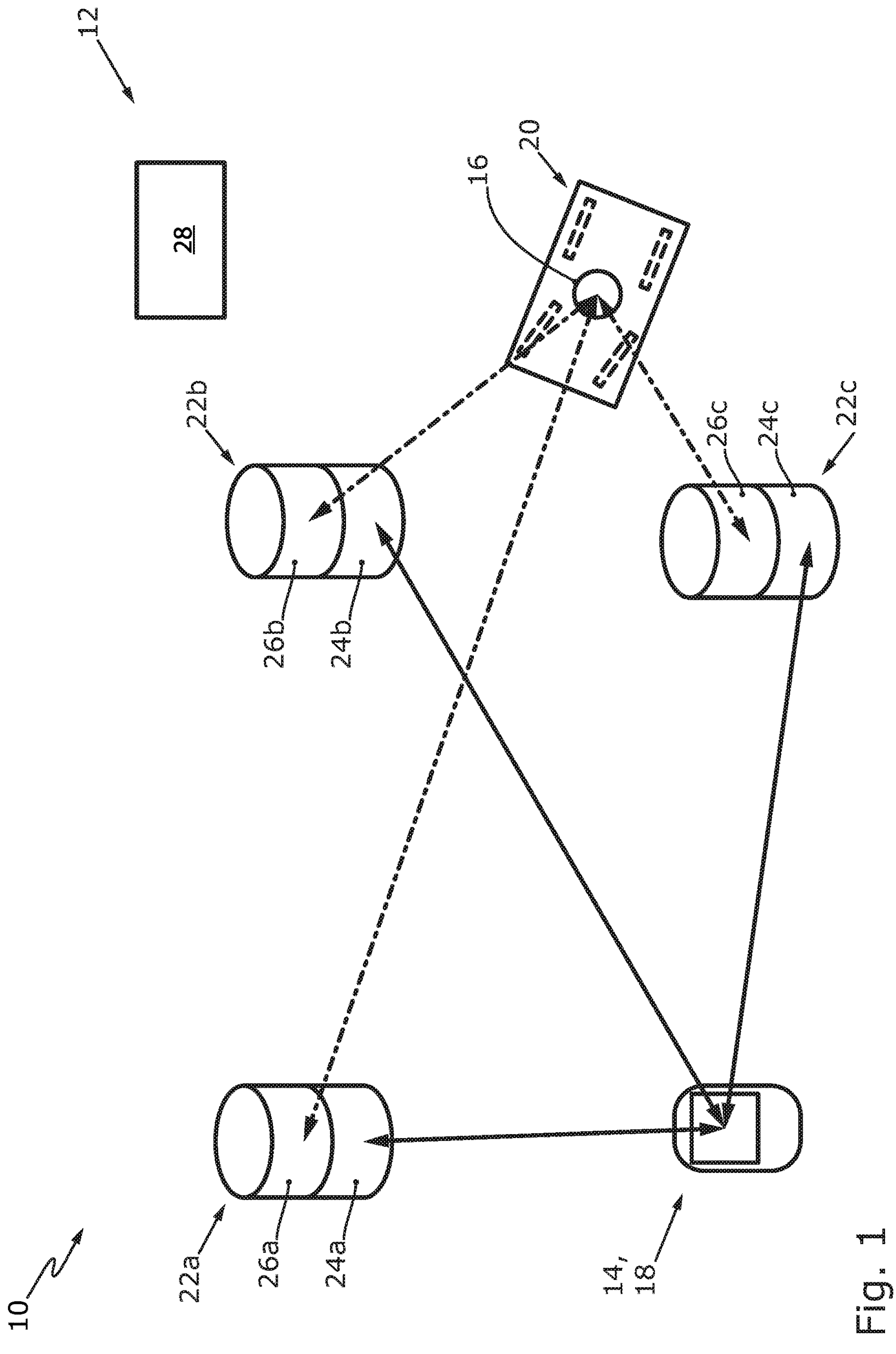
FIG. 1 shows a schematic view of a localization system for localizing different mobile units with different UWB antennas according to some embodiments.

Embodiments of the invention can make localization more reliable, in particular in an industrial manufacturing facility.

Embodiments of the invention provide a UWB anchor for localizing different UWB mobile units, in particular in an industrial manufacturing facility, the UWB anchor having a first UWB antenna for communication with a first UWB mobile unit and a second UWB antenna for communication with a second UWB mobile unit.

In a preferred embodiment, the first and second UWB mobile units may be accommodated in a single housing.

UWB is a radio standard that is used over short distances and for localization purposes in factories (industrial manufacturing facilities). Ultra-wideband is robust toward interference from other radio sources and multiple reflections, which can frequently occur in particular in factories in the metal processing industry, and ensures precise localization of materials, orders and navigation of automated guided vehicles (AGVs) and drones—even when there are obstacles such as metal reflections.

The use of at least two UWB antennas per UWB anchor ("beacons") allows the localization of different UWB mobile units ("tags" or "tag devices") with almost the same installation effort (e. g., surveying effort) and maintenance effort. Due to the "parallel installation" of the "double antennas", use of the power supply, data connection, local fixation and physical set-up can be shared.

Construction, localization, communication and/or data protocols using UWB can take place in particular in accordance with the description of WO 2020/212722 A1, which is included in this application in its entirety by way of reference. WO 2020/212722 A1, entitled "Ultra-Wideband Location Systems and Methods", was filed on Apr. 19, 2019 and published on Oct. 22, 2020.

The radiation angle of the first UWB antenna preferably corresponds substantially to the radiation angle of the second UWB antenna. The radiation angle of the two (at least two) UWB antennas is preferably substantially the same in order to achieve good spatial coverage.

The UWB anchor can have a common housing and/or a common printed circuit board for the two UWB antennas. This further simplifies the installation of the UWB anchor.

Alternatively, or in addition, the UWB anchor may have a common microcontroller and/or a common System On Chip (SOC) to control the two UWB antennas. SOC is understood to be the integration of all or a large part of the functions of a programmable electronic system on a chip, i.e., an integrated circuit on a semi-conductor substrate, also referred to as monolithic integration.

In a preferred embodiment of the invention, the two UWB antennas are designed to communicate in different frequency bands. The separation of the frequency bands allows interference-free parallel operation. The frequency bands may partially overlap. Preferably, however, the frequency bands do not overlap.

One UWB antenna is preferably designed here for communication in a first frequency band, in particular around 8 GHz, and the other UWB antenna is preferably designed for communication in a second frequency band, in particular around 4 GHz. The frequency band around 8 GHz preferably has a center frequency of 7656 MHz. In the frequency band around 8 GHz, only a few other radio signals interfere. In a protected environment, for example in an industrial manufacturing facility, local frequency usage can be managed by the building owner. Due to the lower attenuation, a frequency band around 4 GHz is preferably used here. The frequency band around 4 GHz preferably has bands with center frequencies of 3432 MHz, 3960 MHz and/or 4488 MHz.

Embodiments of the invention also provide a localization system for determining the position of at least two UWB mobile units, in particular in an industrial manufacturing facility, the localization system comprising a control device and a plurality of UWB anchors according to embodiments of the invention connected to the control device.

The localization system can be synchronized and clocked. At least one of the two UWB antennas is preferably clocked. The localization system is designed in particular for localization by time difference of arrival (TDoA), reconfigured time off light (RToF) and/or GPS-like (inverse TdoA).

Preferably, UWB components that comply with the IEEE 802.15.4z standard are used for the UWB anchor(s) and/or the localization system.

Radio communication between the mobile units and the UWB anchors can be transmitted using available UWB and/or Bluetooth Low Energy (BLE) and/or ZigBee. ZigBee is a specification for wireless networks with low data volume and low power consumption such as home automation, sensor networks and lighting. ZigBee is based on the IEEE 802.15.4 standard and extends the functionality thereof in particular by the possibility of routing and secure key exchange.

The UWB anchors can each have a common communication path between the UWB anchors and the control device. The common communication path between the UWB anchors and the control device can be at least partially wired and/or at least partially wireless. Preferably, the communication path is designed for operation via WIFI and/or 4G or 5G. 4G and 5G mean the generations of the mobile radio standard, wherein 4G means the entire LTE (Long Term Evolution) standard, i.e. also 3.9G.

Alternatively or additionally, the localization system may have a central software module for setting up and managing the UWB anchors. System maintenance and a system update can be performed from a remote instance, in particular in the form of a cloud, of the localization system by the central software module.

The localization system may comprise a consumer device, with at least one of the two mobile units being part of the consumer device. The consumer device can be designed in the form of a smartphone and/or a handheld device. Handheld device means a device which is configured to be held in the hand by a worker, to output and display, as well as record, data and/or information with this worker here, and to exchange data and information, in particular digitally and wirelessly, with other devices and to process data.

The UWB antennas can be designed for communication in different standards. In particular, the first UWB antenna can be designed for communication in a first standard and the second UWB antenna for communication in a second standard. The UWB anchor is thus able to communicate via two standards simultaneously.

A UWB antenna may be designed to communicate in a Car Connectivity Consortium (CCC) standard (see https://carconnectivity.org/) and/or Fine Ranging (fira) Consortium standard (see https://www.firaconsortium.org/).

The localization system may comprise the second mobile unit.

Preferably, one of the two UWB antennas is designed for communication in the Omlox standard. Omlox is an open standard for a precise real-time localization system for indoor spaces. Omlox defines open interfaces for an interoperable localization system. Omlox allows different sectors to use a single infrastructure with different applications from different providers. Since the same infrastructure is used, the overall operating costs are lowered, which allows simple integration of different applications. A key feature of Omlox is that it enables a cyberphysical simplification and combines the integration of industrial software and hardware solutions into a shared ecosystem.

Using Omlox-based UWB anchors, various types of software such as a manufacturing executive system (MES), asset tracking and navigation with anti-collision, and also hardware such as drones, AGVs and loading vehicles, can be integrated into the localization area.

Omlox enables interoperability and flexibility for different trackable providers within one or more tracking zones. Omlox achieves this through two core components: Omlox Hub and Omlox Core Zone. The Omlox Hub enables interoperability and flexibility within different tracking zones, while the Omlox Core Zone provides interoperability and flexibility within a single tracking zone.

The Omlox Hub enables interoperability and flexibility across different complementary zones. In addition to UWB, other localization technologies such as RFID, 5G, BLE, WIFI and GPS are also used in production, delivery and storage. Omlox can be used to ensure that networks function smoothly and interoperably. Businesses are thereby easily able to network applications such as production control systems, installation tracking and navigation across different location zones.

The Omlox hub is compatible with multiple tracking zones. Smart factories that operate with a UWB localization zone, a truck loading area with GPS positioning and a warehouse with WIFI positioning can be efficiently monitored using the Omlox Hub. The Omlox Hub enables the transmission, synchronization and alignment of maps from discrete local coordinates (mapping of SLAM and other techniques) to global geographical coordinates of a smart factory, i.e. a production environment in which manufacturing plants and logistics systems largely organize themselves, with little or no human intervention, in order to produce the desired products. SLAM means: Simultaneous Localization and Mapping.

The Omlox Core Zone works together with open interfaces and guarantees interoperability in the UWB range. Omlox creates an interoperable infrastructure that operates by plug-and-play. Businesses are able to network all UWB products quickly and easily independently of the manufacturer using the Omlox standard.

The UWB communication takes place within the Omlox Core Zone. The Omlox Hub is one level above that.

The characteristics of the Omlox anchors are described in more detail in the Omlox specification, which is published on https://omlox.com.

In a further preferred embodiment of the invention, at least one UWB anchor is integrated in a smoke detector and/or in a lighting installation of the localization system. Preferably, several UWB anchors, in particular all UWB anchors, are each integrated into a smoke detector and/or a lighting installation of the localization system.

Embodiments of the invention further relate to an industrial manufacturing facility, in particular in the form of a metal processing facility, preferably in the form of a sheet metal processing facility, comprising an anchor according to embodiments of the invention. Embodiments of the invention further relate to an industrial manufacturing facility, in particular in the form of a metal processing facility, preferably in the form of a sheet metal processing facility, comprising a localization system according to embodiments of the invention.

Embodiments of the invention further provide a method for localizing mobile units, in particular in an industrial manufacturing facility, wherein the localization is carried out with UWB anchors each comprising two UWB antennas.

Preferably, communication via one of the two UWB antennas takes place in a different frequency band than via the other of the two UWB antennas.

Preferably, communication takes place via one of the two UWB antennas in a frequency band around 8 GHz and via the other UWB antenna in a frequency band around 4 GHz.

Communication via the first of the two UWB antennas can be performed in a first standard, in particular the Car Connectivity Consortium (CCC) and/or Fine Ranging (fira) Consortium standard. Communication via the second UWB antenna can be performed in a second standard, in particular the Omlox standard. In particular, communication can take place simultaneously in the first standard and in the second standard.

Further advantages of the embodiments of the invention are evident from the description and the drawing. Similarly, according to embodiments of the invention, the features mentioned above and those yet to be explained further can be used in each case individually or together in any desired combinations. The embodiments shown and described should not be understood as an exhaustive list, but rather are of an exemplary character for outlining the invention.

FIG. 1 shows an indoor space, in particular an industrial manufacturing facility 10, with a localization system 12 for localizing a first mobile unit 14 and a second mobile unit 16. The first mobile unit 14 is part of a consumer device 18, here in the form of a smartphone. The second mobile unit 16 is arranged on an automated guided vehicle 20 (AGV) or is formed on the automated guided vehicle 20. The self-driving vehicle 20 is used for transporting materials in the interior, in particular the industrial manufacturing facility 10.

The localization system 12 has UWB anchors 22*a*, 22*b*, 22*c* for localizing the mobile units 14, 16. The UWB anchors 22*a-c* each have a first UWB antenna 24*a*, 24*b*, 24*c* and a second UWB antenna 26*a*, 26*b*, 26*c*. The first UWB antennas 24*a-c* are used to communicate with the first mobile unit 14 via a first standard (shown with solid arrows), and the second UWB antennas 26*a-c* are used to communicate with the second mobile unit 16 via a second standard (shown with dot-and-dash arrows). The UWB anchors 22*a-c* are connected wirelessly or in a wired manner to a control device 28.

Figure 2:
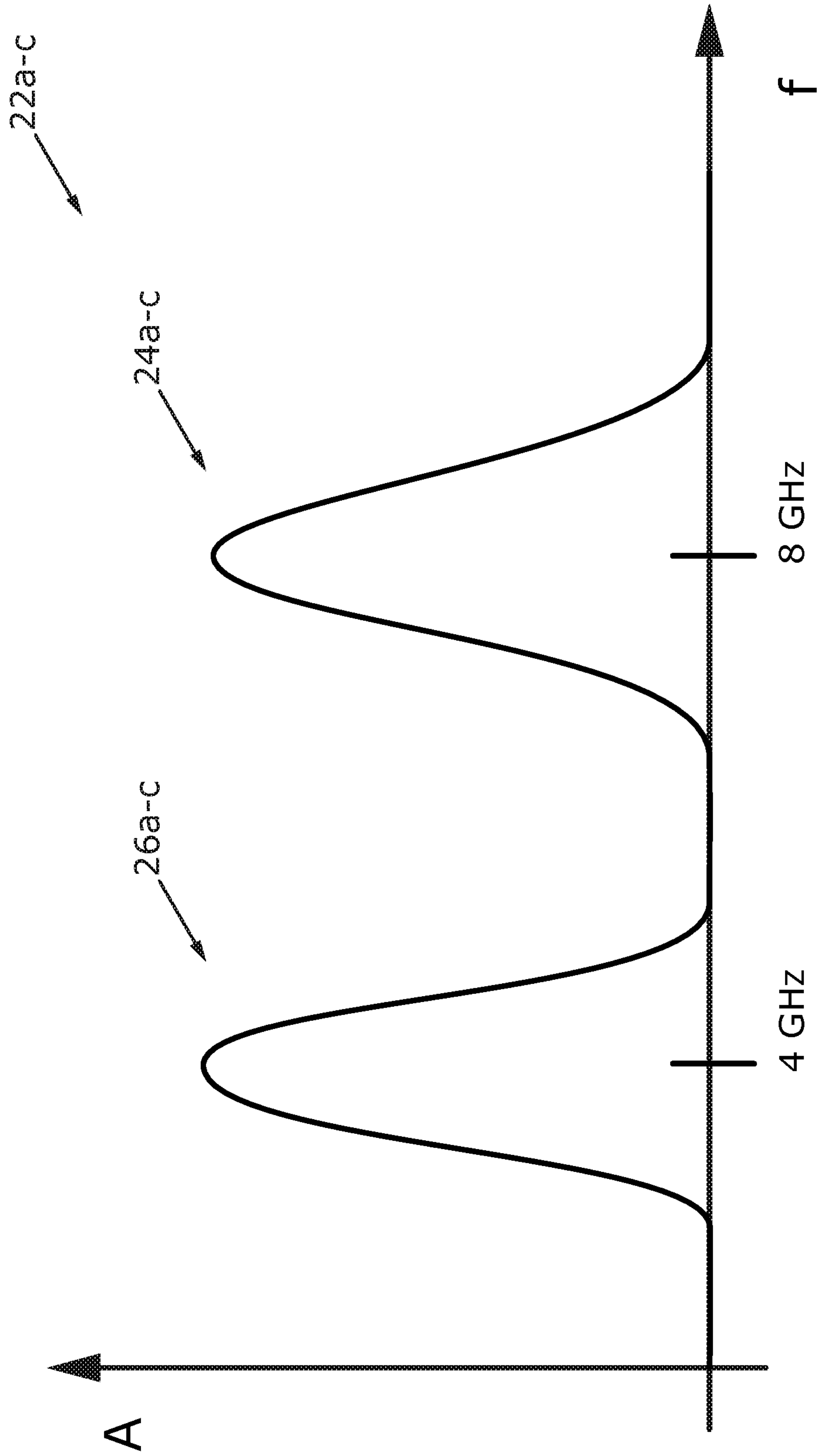
FIG. 2 schematically shows the signals sent using the various UWB antennas according to some embodiments.

FIG. 2 shows that the signal transfer from and to the UWB anchors 22*a-c* takes place at frequencies around 4 GHz and 8 MHz. More specifically, the first UWB anchor antennas 24*a-c* preferably send and receive at frequencies around 8 GHz and the second UWB anchor antennas 26*a-c* at frequencies around 4 GHz.

Figure 3:
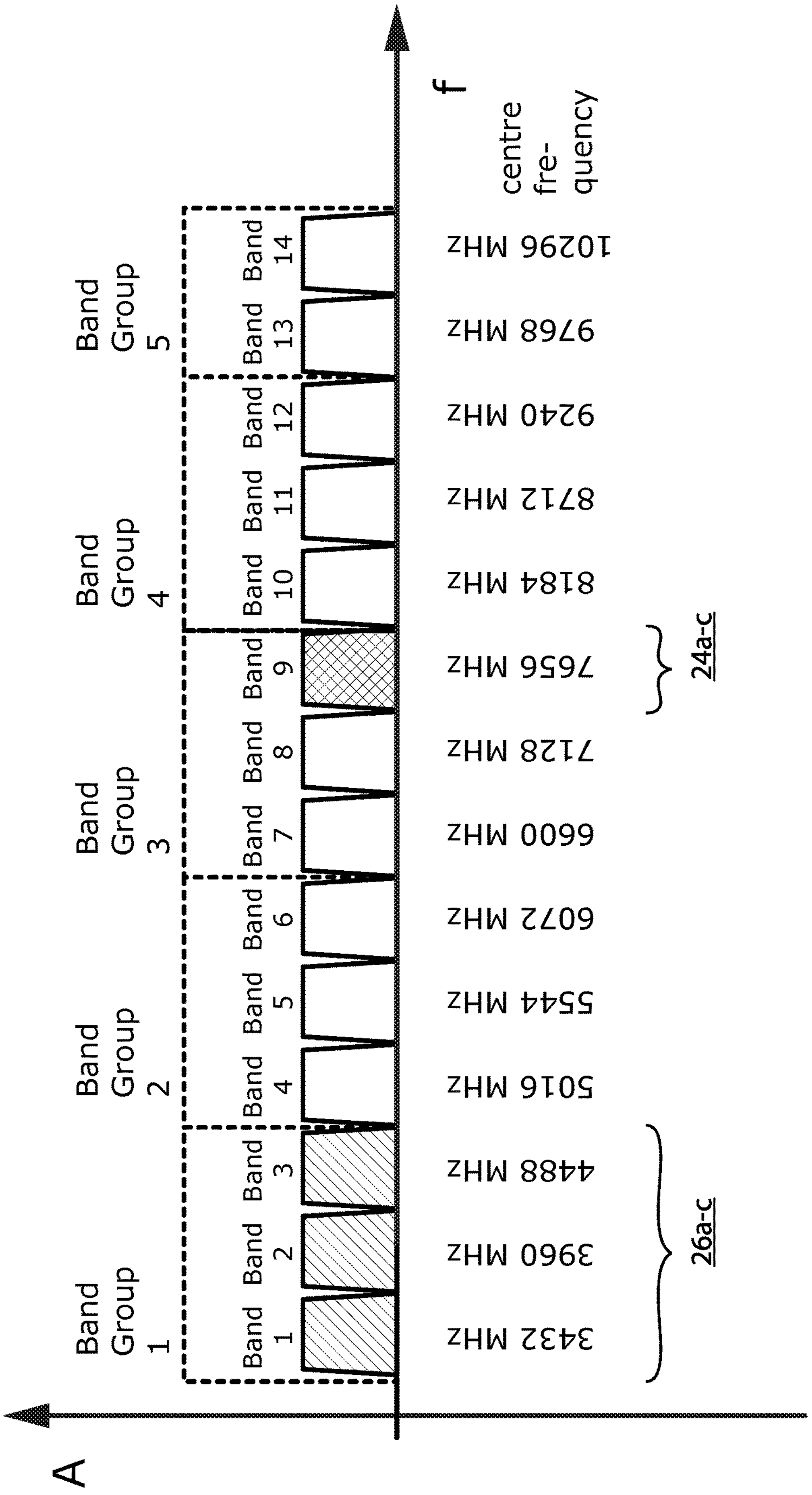
FIG. 3 schematically shows standardized frequency ranges for compiling the signals sent in FIG. 2 according to some embodiments.

FIG. 3 shows the frequencies used by the first UWB antennas 24*a-c* and the second UWB antennas 26*a-c*. It can be seen from FIG. 3 that the first UWB antennas 24*a-c* preferably use frequency band 9 with the center frequency 7656 MHz, and the frequency bands 1, 2 and 3 with the center frequencies 3432 MHz, 3960 MHz and 4488 MHz are preferably used for the second UWB antennas 26*a-c*.

Looking collectively at all figures of the drawing, embodiments of the invention relate to a UWB anchor 22*a-c* having a first UWB antenna 24*a-c* for communication with a first mobile unit 14 and a second UWB antenna 26*a-c* for communication with a second mobile unit 16. The UWB anchor 22*a-c* is preferably configured for communication in different frequency bands. The UWB anchor 22*a-c* may be part of a localization system 12. Furthermore, embodiments of the invention relate to a method for localizing two different mobile units 14, 16 using UWB anchors 22*a-c* with two different UWB antennas 24*a-c*, 26*a-c*.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C

LIST OF REFERENCE SIGNS

- 10 industrial manufacturing facility
- 12 localization system
- 14 first mobile unit
- 16 second mobile unit
- 18 consumer device
- 20 automated guided vehicle
- 22*a-c* UWB anchor
- 24*a-c* first UWB antenna
- 26*a-c* second UWB antenna
- 28 control device

The invention claimed is:

1. A localization system for determining a position of a first ultra-wideband (UWB) mobile unit and a position of a second UWB mobile unit in an industrial manufacturing facility, the localization system comprising:

a control device; and a plurality of UWB anchors each configured to localize the first UWB mobile unit and the second UWB mobile unit in an interior space of the industrial manufacturing facility, each of the plurality of UWB anchors comprising:

a first UWB antenna for communication with the first UWB mobile unit and a second UWB antenna for communication with the second UWB mobile unit.

2. The localization system of claim 1, wherein a radiation angle of the first UWB antenna and a radiation angle of the second UWB antenna are the same.

3. The localization system of claim 1, further comprising:
a common housing for the first UWB antenna and the second UWB antenna; and/or
a common printed circuit board connected to both the first UWB antenna and the second UWB antenna.

4. The localization system of claim 1, further comprising:
a common microcontroller and/or a common system on chip (SOC) configured to control the first UWB antenna and the second UWB antenna.

5. The localization system as claimed in claim 1, wherein the first UWB antenna and the second UWB antenna are configured for communication in different frequency bands.

6. The localization system as claimed in claim 5, wherein the first UWB antenna is configured for communication in a first frequency band around 8 GHz and the second UWB antenna is configured for communication in a second frequency band around 4 GHz.

7. The localization system as claimed in claim 1, wherein the plurality of UWB anchors comprises:
a common communication path between the UWB anchors and the control device.

8. The localization system as claimed in claim 1, further comprising a central software module for setting up and managing the plurality of UWB anchors.

9. The localization system as claimed in claim 1, further comprising a consumer device, wherein the first UWB mobile unit is part of the consumer device.

10. The localization system as claimed in claim 1, wherein the first UWB antennas and the second UWB antennas are configured for communication in different communication standards.

11. The localization system as claimed in claim 10, wherein one of the first UWB antenna and the second UWB antenna is configured for communication in an Omlox standard.

12. The localization system as claimed in claim 1, wherein at least one of the plurality of UWB anchors is integrated in a smoke detector and/or in a lighting installation of the localization system.

13. A method for localizing mobile units in an industrial manufacturing facility, using a localization system for determining a position of a first ultra-wideband (UWB) mobile unit and a position of a second UWB mobile unit in an industrial manufacturing facility, the method comprising:
providing a localization system including:
a control device, and
a plurality of UWB anchors each configured to localize the first UWB mobile unit and the second UWB mobile unit in an interior space of the industrial manufacturing facility, each of the plurality of UWB anchors comprising a first UWB antenna for communication with the first UWB mobile unit and a second UWB antenna for communication with the second UWB mobile unit; and
performing localization of the mobile units with the plurality of UWB anchors by communicating with the first mobile unit using one or more of the first UWB antennas of the plurality of UWB anchors and communicating with the second mobile unit using one or more of the second UWB antennas of the plurality of UWB anchors.

14. The method as claimed in claim 13, wherein the communication via the one or more first UWB antennas takes place in a different frequency band than the communication via the one or more second UWB antennas.

15. The method as claimed in claim 13, wherein
the communication via the one or more first UWB antennas is performed in a first standard, and
the communication via the one or more second UWB antennas is performed in a second standard different from the first standard.

16. The method as claimed in claim 15, wherein the first standard is a Car Connectivity Consortium (CCC) standard, and/or a Fine Ranging (fira) Consortium standard, and
the second standard is an Omlox standard.

* * * * *